United States Patent [19]

Noguchi

[11] Patent Number: 4,587,530

[45] Date of Patent: May 6, 1986

[54] THERMAL HEAD DRIVING/CONTROL APPARATUS

[75] Inventor: Akio Noguchi, Kanagawa, Japan

[73] Assignee: Fuji Xerox Co., Ltd., Tokyo, Japan

[21] Appl. No.: 531,782

[22] Filed: Sep. 13, 1983

[30] Foreign Application Priority Data

Sep. 13, 1982 [JP] Japan ................................ 57-158204

[51] Int. Cl.[4] ............................................ G01D 15/10

[52] U.S. Cl. ............................... 346/76 PH; 400/120; 219/216

[58] Field of Search ......................... 346/76 PH, 76 R; 400/120; 219/216 PH; 250/317.1, 318

[56] References Cited

U.S. PATENT DOCUMENTS 4,415,908 11/1983 Sugiura .......................... 346/76 PH

*Primary Examiner*—E. A. Goldberg
*Assistant Examiner*—A Evans
*Attorney, Agent, or Firm*—Sughrue, Mion, Zinn, Macpeak and Seas

[57] ABSTRACT

A thermal head driving/control apparatus used to correct temperature conditions individually for heating elements constituting a thermal head employed according to a thermal-sensitive recording system in facsimile equipment. The device provides a correction signal for each printing signal provided to a heating element of a thermal head. The thermal head selectively prints dots in recording, bit by bit, to form an image made up of lines of bits. The correction signal is formed by counting the number of dots printed within the vicinity of a reference bit. The correction signal follows the primary printing signal for each bit of a line to additionally heat an element or not to achieve ideal printing of dot to maintain an associated substrate portion at a desired operating temperature resulting in a uniform printing concentration. The device of the invention can be employed in facsimile equipment to provide a temperature correction device which reduces uneven printing concentration.

8 Claims, 12 Drawing Figures

FIG. 3
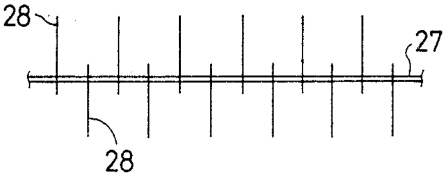
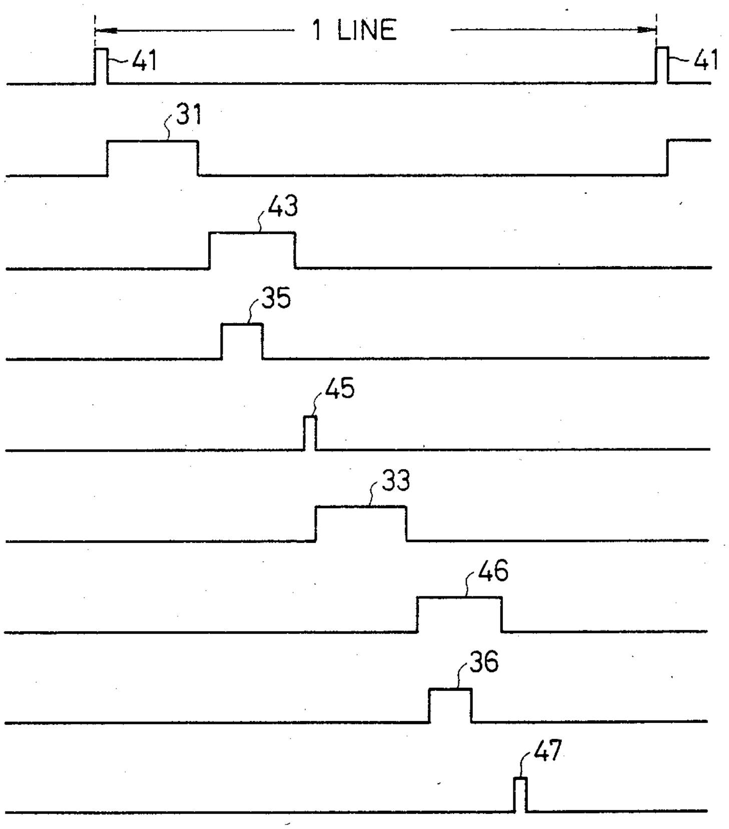
FIG. 4A
FIG. 4B
FIG. 4C
FIG. 4D
FIG. 4E
FIG. 4F
FIG. 4G
FIG. 4H
FIG. 4I

THERMAL HEAD DRIVING/CONTROL APPARATUS

BACKGROUND OF THE INVENTION

The present invention relates to a thermal head driving/control apparatus which corrects printing density distortions occurring in a recording device which employs a thermal head. In many such recording devices, commonly found in facsimile equipment, picture information is recorded by a thermal head according to a linearly successive recording system. That is, an image is broken into a series of lines and is recorded one line at a time.

In such devices, the thermal head includes a plurality of heating elements formed on a substrate. The temperature of each heating element and the temperature of the substrate portion in the vicinity of a particular heating element are affected by the driving history of the heating element in recording previous lines. For example, if one heating element is driven to continuously generate heat for several contiguous lines, thermal energy will locally accumulate around that element, thereby increasing the temperature of the substrate portion located in the vicinity of the heating element. The resultant accumulated energy imposes a higher temperature on the heating element than that which would be imposed had the heating element not been driven continuously. Thus, the local temperature deviation of the heating elements and substrate affects the operating temperatures of the elements as successive lines are recorded. This deviation from operating temperatures normally expected for recording an image, if uncorrected, results in uneven printing density.

As a countermeasure, a method has been proposed in which the substrate is heated by a controlled heater. However, according to this method, it is necessary to detect the temperature of the substrate at several portions thereof before applying the correction. Accordingly, problems occur with this method in that (1) thermal response is poor, and (2) fine control for heating each individual element cannot be performed. It is an object of the present invention to overcome these problems.

SUMMARY OF THE INVENTION

The present invention provides a thermal head driving/control apparatus with which heating control can be quickly performed with respect to each heating element. According to the present invention, the amount of thermal energy accumulated by each heating element over a given time period is calculated from previous picture information. In response thereto, correction information is produced which is used to control the heating of each element and thereby correct any uneven printing density that might otherwise occur.

BRIEF DESCRIPTION OF THE DRAWINGS

FIG. 3 is a diagram showing the structure of a thermal recording head; and

FIG. 4A–4I is a timing chart showing waveforms of various signals provided to the thermal head of the apparatus.

DESCRIPTION OF THE PREFERRED EMBODIMENT

Figure 1:
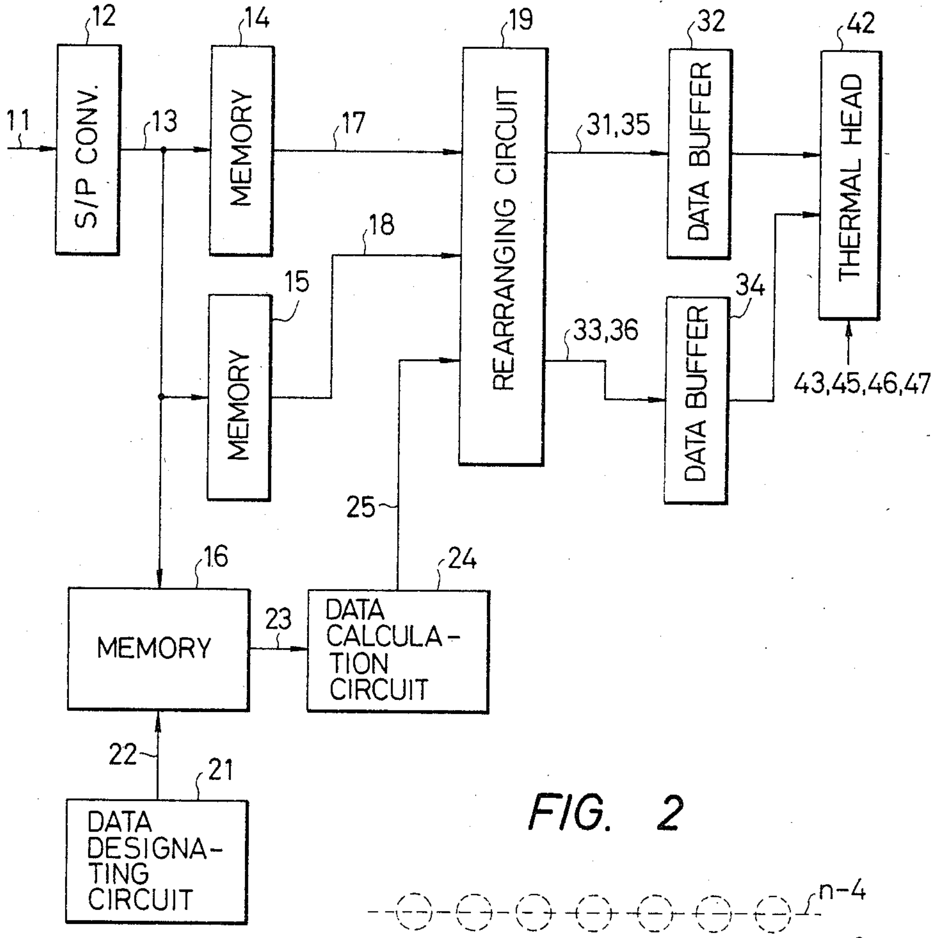
FIG. 1 is a block diagram illustrating the main circuit elements of a preferred embodiment of a thermal head driving/control apparatus according to the invention.

FIG. 1 is a schematic block diagram of a thermal head driving/control apparatus of the invention used in a reception unit of a facsimile device. A signal transmitted from a transmission unit of another facsimile device is demodulated, and a serial picture signal 11 is formed by a decoder (not shown). The serial picture signal 11 is supplied to a serial/parallel converter 12 which converts the picture signal 11 into a one-line parallel picture signal 13. The picture signal 13 is supplied to the input side of each of a first memory 14 and a second memory 15 and to a correction data memory 16. Alternate lines are written into the first memory 14 and the second memory 15, one line at a time, under the control of a control circuit (not shown). Upon completion of the writing operation, a picture signal 17 and a picture signal 18 are alternately read out one line at a time from the first memory 14 and the second memory 15. The picture signals 17 and 18 read out from first memory 14 and second memory 15, respectively, are supplied to a rearranging circuit 19. The rearranging circuit 19 includes a random access memory into which the picture signals 17 and 18 are written at addresses corresponding to respective bits of each line.

Figure 2:
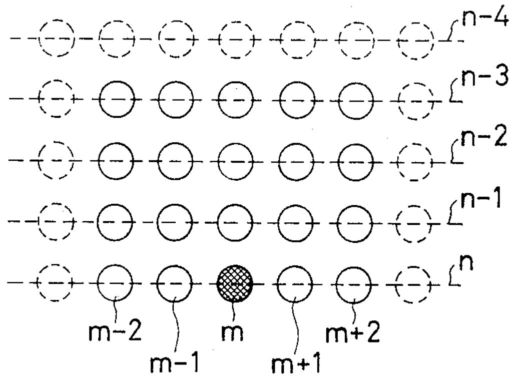
FIG. 2 is a diagram showing the arrangement of the picture signal information which is used to calculate data for performing a temperature correction.

While alternate lines of the picture signal 13 are provided to first and second memories 14 and 15, every line of the picture signal 13 is provided to the correction data memory 16 which stores each line in one of a plurality of line buffers incorporated therein. Each of the line buffers stores a line of picture signal 13. For example, assuming that the correction data memory 16 is provided with four line buffers, four lines of the picture signal 13 are stored in the correction data memory 16 with one of the line buffers storing the most recent line provided. Upon writing an entire line of the picture signal 13 into the correction data memory 16, a correction data designating circuit 21 produces address information 22 corresponding to the data to be read out of the line buffers of the correction data memory 16 before the next line of the picture signal 13 is supplied. The address information 22 which is produced corresponds to individual bits of the picture signal 13 in the vicinity of a reference bit m (m being a positive integer) of a line n (n being a positive integer), with line n being the most recently provided line stored in the correction data memory 16. The reference bit m and surrounding bits of the picture signal 13 are shown in FIG. 2.

When the m-th bit of the line n is designated, address information corresponding to the respective bits $m-2$, $m-1$, $m+1$, and $m+2$ of line n is produced. In response to this information, bits from picture signal 23 corresponding to the respective bits of the address information 22 are produced by the correction data memory 16 from a particular line buffer and supplied to a data calculation circuit 24. Next, address information corresponding to five bits, $m-2$ through $m+2$, of the line $n-1$, which is the line recorded previous to the n-th line, is produced. In response to this information, bits of the picture signal 23 corresponding to the designated five bits of the line $n-1$ are read out of the correction data memory 16 and supplied to the data calculation circuit 24. In the same manner, bits of the picture signal 23 corresponding to bits $m-1$ through $m+2$ are read out with respect to the two lines $n-2$ and $n-3$. This operation is repeated for all m bits of the most recently provided line stored in the correction data memory 16.

The data calculation circuit 24 counts the number of printed dots (picture signal in the black state) in the nineteen bits of the picture signal 23 which are supplied to the data calculation circuit 24 to determine a temperature correction corresponding to the m-th bit of the picture signal 13. The data calculation circuit 24 produces a signal "1" when the count is within a range of zero to seven. This corresponds to a correction which will cause a particular heating element which prints the information contained in the m-th bit to conduct for a short time. When the count is in the range from eight to nineteen, the data calculation circuit 24 produces a signal "0" which corresponds to no correction for a particular heating element. A correction data signal 25 thus produced is supplied to the rearranging circuit 19.

After counting the number of black picture elements of the nineteen bits in the vicinity of the m-th bit of the line n and producing the appropriate correction data signal 25, the data calculation circuit 24, correction data memory 16, and correction data designating circuit 21 perform the same operation with respect to the next bit $(m+1)$ of line n. A correction data signal 25 for each information bit of line n is supplied to the rearranging circuit 19 in this manner and written into the above-mentioned random access memory of the rearranging circuit 19. The rearranging circuit 19 thus contains the bits of a line n of the picture signal 13 and the correction data signals 25 corresponding to each bit.

The picture signal 17 or 18, written into the rearranging circuit 19, is rearranged in accordance with the driving system of the thermal head. The thermal head of this embodiment has a known configuration, as shown in FIG. 3, in which conductor wires 28 are disposed at equal intervals on a heating body 27. Printing is achieved by forming two dots on thermally sensitive paper at intervals of two dots. Accordingly, it is necessary to rearrange the picture signal for each line such that every two bits are removed at intervals of two bits so that two kinds of picture signals for each line are printed. First and second printing data signals 31 and 33 are thus generated. The first and second printing data signals 31 and 33 are supplied to a first and second data buffer 32 and 34, respectively. After the printing data signals 31 or 33 are read out of the rearranging circuit 19, a similar operation is performed with respect to the correction data signal 25 so that two kinds of correction signals, first and second printing temperature correction data signals 35 and 36, are formed. The first and second printing temperature correction data signals 35 and 36 are supplied to the first and second data buffers 32 and 34, respectively. The first data buffer 32 processes the first printing data signal 31 and the first printing temperature correction data signal 35 according to a time division method. The second data buffer 34 processes signals 33 and 36 in the same manner.

FIG. 4 is a timing chart showing the first and second printing data signals 31 and 33 and the first and second printing temperature correction data signals 35 and 36. When a start signal 41 is produced as shown in FIG. 4A for a single line printing period, the first printing data signal 31, shown in FIG. 4B, is read out of the rearranging circuit 19 and stored in the first data buffer 32. Thereafter, the first printing data signal 31 is set in a shift register (not shown) in a thermal head 42. The printing operation by the thermal head 42 is carried out according to the first printing data signal 31 in response to a first data driving pulse 43, shown in FIG. 4C, applied to the thermal head 42.

The first data driving pulse 43 has a pulse width that is slightly less than the pulse width of a driving signal found in conventional devices. That is, assuming it would be ideal to employ a one millisecond pulse for driving a heating element under conditions of average temperature of the substrate to print a single black dot, the first data driving pulse 43 should have a pulse width of approximately 0.8 milliseconds.

When the first data driving pulse 43 is provided to the thermal head, the first printing temperature correction data signal 35, FIG. 4D, is read out of the rearranging circuit 19. The first printing temperature correction data signal 35 is stored in the first data buffer 32, replacing the first printing data signal 31, and then is inputted to the shift register of the thermal head 42 when the first data driving pulse 43 terminates. Once the first printing temperature correction data signal 35 is set into the shift register of the thermal head 42, a first temperature correction pulse 45, FIG. 4E, is applied to the thermal head 42 so that a temperature correction is performed according to the first printing temperature correction data signal 35.

If the pulse width of the first data driving pulse 43 is set to be approximately 0.8 millisecond, then the pulse width of the first temperature correction pulse 45 is set to be approximately 0.2 millisecond. When the first data printing signal 31 is set to cause a particular heating element to print a black dot and the first printing temperature correction data signal is set at "1", the heating element is caused to generate heat for an additional short time. This results in the temperature of the heating elements being maintained at an ideal level at all times, thus providing a suitable printing density at all times.

When the first printing data signal 31 contains information corresponding to printing no dot, the application of the first temperature correction pulse 45 according to the first printing temperature correction data signal 35 exhibiting a "1" will cause the heating element to conduct only for the short correction time. This heating is sufficient to maintain the substrate at a desired temperature, but insufficient to cause the printing of a dot on the thermally sensitive paper.

Once the above-mentioned first printing operation is completed, the second printing data signal 33, shown in FIG. 4F, is read out of the rearranging circuit 19 and stored in the second data buffer 34. The second printing data signal 33 is then supplied to the shift register of the thermal head 42, and printing is carried out according to this signal in response to a second data driving pulse 46, shown in FIG. 4G. Simultaneously, the second printing temperature correction data signal 36, shown in FIG. 4H, is read out of the rearranging circuit 19 and stored in the second data buffer 34. When the second data driving pulse 46 terminates, the second printing temperature correction data signal 36 is supplied to the shift register of the thermal head 42. In response to a second temperature correction pulse 47 shown in FIG. 4I, temperature correction is performed according to the information contained in the second printing temperature correction data signal 36. The pulse width of the second data driving pulse 46 is set to be equal to or at most 0.1 to 0.2 millisecond less than the pulse width of the first data driving pulse 43. The pulse width of the second temperature correction pulse 47 is set to be equal to that of the first temperature correction pulse 45.

Thus, the thermal head 42 is driven by four kinds of data signals. Printing operations are performed two bits at a time until the recording of one entire line is completed. Upon completion, a new line is read into the memory devices and a similar recording operation is initiated for it.

Although, in the embodiment described, uniform weighting is made with respect to the dot information in the vicinity of a reference point to provide correction data, the weighting may of course be increased to achieve better results. It is often beneficial to change the weighting in accordance with the relative speed between the thermally sensitive paper and the recording head.

Thus, according to the present invention, the data for printing and the data for temperature correction are processed by a commonly used rearranging circuit 19 using a time division method. This design allows the number of circuit components needed to be reduced, producing a reduction in the net cost of the apparatus and in an improvement in the overall reliability of the circuit while providing an apparatus which significantly limits the occurrence of uneven printing density.

I claim:

1. In a recording device performing picture data recording one line at a time using a thermal head, a thermal head driving/control apparatus comprising:

a picture data memory for storing picture signals each corresponding to one of a plurality of lines which make up a recorded image, each picture signal corresponding to an information bit, a plurality of which make up a line;

a correction data memory for storing picture signals corresponding to several of a plurality of lines which make up a recorded image, the most recently provided line successively displacing the least recently provided line in said correction data memory;

a correction data designating circuit for producing address information signals for said correction data memory such that picture signals corresponding to information bits located in the vicinity of a designated reference bit are output by said correction data memory;

a data calculation circuit for counting the number of picture signals addressed by said correction data designating circuit and provided from said correction data memory which contain information commanding printing of a black dot for producing a correction signal which has one of two states depending on the number of picture signals counted by said data calculation circuit which command printing of a black dot;

a rearranging circuit for interspersing picture signals from said picture data memory with corresponding correction signals provided from said data calculation circuit;

a data buffer for storing picture signals alternating with correction signals as provided in sequence from said rearranging circuit; and a thermal head including a plurality of heating elements for printing a recorded image by activating heating elements thereof in response to picture and correction data signals provided by said data buffer;

means for producing address information signals corresponding to a predetermined first number of bits on either side of said reference bit in the same line as said reference bit and bits of similar line position as said reference bit and said predetermined first number of bits on said either side of said reference bit in a second predetermined number of successive lines previous to said line containing said reference bit.

2. In a recording device performing picture data recording one line at a time using a thermal head, a thermal head driving/control apparatus comprising:

a picture data memory for storing picture signals each corresponding to one of a plurality of lines which make up a recorded image, each picture signal corresponding to an information bit, a plurality of which make up a line;

a correction data memory for storing picture signals corresponding to several of a plurality of lines which make up a recorded image, the most recently provided line successively displacing the least recently provided line in said correction data memory;

a correction data designating circuit for producing address information signals for said correction data memory such that picture signals corresponding to information bits located in the vicinity of a designated reference bit are output by said correction data memory;

a data calculation circuit for counting the number of picture signals addressed by said correction data designating circuit and provided from said correction data memory which contain information commanding printing of a black dot for producing a correction signal which has one of two states depending on the number of picture signals counted by said data calculation circuit which command printing of a black dot;

a rearranging circuit for interspersing picture signals from said picture data memory with corresponding correction signals provided from said data calculation circuit;

a data buffer for storing picture signals alternating with correction signals as provided in sequence from said rearranging circuit; and a thermal head including a plurality of heating elements for printing a recorded image by activating heating elements thereof in response to picture and correction data signals provided by said data buffer;

a first data buffer for storing and reading out a first picture signal and a corresponding first correction signal and a second data buffer for storing and reading out a second picture signal and corresponding second correction signal.

3. The apparatus of claim 1 wherein said picture data memory comprises:

a first memory and a second memory for storing alternately picture signals corresponding to alternate lines of an image to be recorded.

4. The apparatus of claim 1 wherein said correction data designating circuit comprises:

means for producing address information corresponding only to information bits located within a predetermined range of a designated reference bit.

5. The apparatus of claim 1 wherein said data calculation circuit comprises:

means for producing a signal representing a state "1" when the number of picture signals read out in response to said address information signals which command printing a black dot is between zero and seven and for producing a signal representing a state "0" when the number of said picture signals is between eight and nineteen.

6. The apparatus of claim 1 wherein said rearranging circuit comprises:

a random access memory for storing picture signals provided from said picture data memory and corresponding correction signals from said data calculation circuit.

7. The apparatus of claim 1 wherein said rearranging circuit comprises:

means for rearranging picture signals provided from said picture data memory and corresponding signals provided from said data calculation circuit into a sequence of a first picture signal and a corresponding first correction signal followed by a second picture signal and a corresponding second correction signal.

8. The apparatus of claim 1 wherein said thermal head comprises:

a plurality of heating elements formed at equal intervals on a substrate providing printing and correcting by forming selectively two dots at intervals of two dots.

* * * * *